United States Patent [19]
Delannoy et al.

[11] Patent Number: 5,971,550
[45] Date of Patent: Oct. 26, 1999

[54] AUTOMOTIVE RETURN REAR VIEW MIRROR

[75] Inventors: Enrique Delannoy, Dearborn; Scott Howard Gaboury, Ann Arbor; David Richard Tengler, West Bloomfield, all of Mich.

[73] Assignee: Ford Global Technologies, Inc., Dearborn, Mich.

[21] Appl. No.: 09/005,679

[22] Filed: Jan. 12, 1998

[51] Int. Cl.[6] ........................................ G02B 5/08
[52] U.S. Cl. .................... 359/843; 359/604; 359/872; 248/478
[58] Field of Search .................... 359/604, 843, 359/872; 248/478, 479

[56] References Cited

U.S. PATENT DOCUMENTS

| | | |
|---|---|---|
| 2,645,158 | 7/1953 | Bertell et al. . |
| 2,806,408 | 9/1957 | Moeller ................................ 359/604 |
| 3,421,728 | 1/1969 | Gordon . |
| 3,495,896 | 2/1970 | Barcus et al. . |
| 4,902,118 | 2/1990 | Harris . |
| 4,934,802 | 6/1990 | Fluharty et al. . |
| 5,327,288 | 7/1994 | Wellington et al. .................... 359/872 |
| 5,557,467 | 9/1996 | McColgan et al. . |
| 5,657,174 | 8/1997 | Boddy .................................... 359/872 |
| 5,668,526 | 9/1997 | Collins . |

*Primary Examiner*—Cassandra Spyrou
*Assistant Examiner*—Euncha Cherry
*Attorney, Agent, or Firm*—Steven A. Maynard

[57] ABSTRACT

An automotive vehicle rear view mirror assembly automatically returnable from a rear seat viewing position to a rear window viewing position includes a bracket, a bracket rod having an axis and extending through and rigidly connected to the bracket, a resilient member disposed about the bracket rod and having an end, a mirror housing pivotally connected to the bracket rod, the housing having a wall portion in resilient contacting relationship with the end, and a flip lever attached to the mirror housing having a bracket receiving end with a bracket contacting surface.

4 Claims, 2 Drawing Sheets

AUTOMOTIVE RETURN REAR VIEW MIRROR

FIELD OF THE INVENTION

The present invention relates to automotive rear view mirrors, and more specifically, to an automatic return feature for such mirrors.

BACKGROUND OF THE INVENTION

When a driver or passenger in an automotive vehicle is conversing with rear seat passengers or if it is desired to check on rear seat children, typically in order to establish visual contact it is necessary to turn around and at least partially face the rear seat occupants. In the case of the driver, this distracts the driver from the attention required for driving. Although some incidental eye contact can be established through the rear view mirror, typically the rearview mirror is not adjusted to align with the location of passengers in the rear seats of the vehicle, but rather along the center line of the vehicle for viewing through the rear window.

One method of viewing rear seat occupants utilized by many drivers is to manually tilt the rear view mirror down until the rear seat occupants come into view. Once the rearview mirror is tilted downward and the rear seat occupants are within view of the driver, the mirror must be readjusted in order to return the mirror to a rear window view. This is a cumbersome and time consuming process. Similar to the aforementioned procedure of physically turning around to view the rear seat, this cumbersome process distracts the driver's attention from the road.

Another method of viewing rear seated occupants is to have a second "conversation" type mirror in addition to the rear view mirror. Although this dual mirror arrangement provides rear seat, as well as rear window, viewing without distracting the drivers attention from the road, it requires additional assembly and increases product cost.

Accordingly, a need exists in the art for a rear seat viewing mirror which does not increase overall product cost nor unnecessarily distract the driver's attention from the road.

SUMMARY OF THE INVENTION

Responsive to the deficiencies in the prior art, the present invention provides an automotive vehicle rear view mirror apparatus automatically returnable from a rear seat viewing position to a rear window viewing position having a bracket, a bracket rod extending through and rigidly connected to the bracket, a mirror housing pivotally connected to the bracket rod, a reflective surface connected to the mirror housing, at least one resilient member having a first end resiliently contacting the mirror housing and a second end resiliently contacting the bracket disposed about the bracket rod, and a flip lever having a bracket receiving end with a bracket contacting surface adjacent to a first side of the bracket, the lever attached to the mirror housing.

According to a preferred embodiment of the present invention the flip lever further includes a bracket stop surface distally opposed to the bracket contacting surface.

An advantage of the present invention is that the present rear view mirror provides a resilient member which biases the bracket contacting surface against the first side in a rear window viewing position and further serves to return the mirror to the rear window viewing position after rotation of the mirror housing about the bracket rod to a rear seat viewing position.

A further advantage of the present invention is that the bracket stop surface limits the angular displacement of the mirror housing upon rotation of the mirror housing about the bracket rod thereby bring the reflective surface to a stop at a rear seat viewing position.

BRIEF DESCRIPTION OF THE DRAWINGS

Other features and advantages of the present invention will become apparent to those skilled in the rear view mirror related arts upon reading the following description with reference to the accompanying drawings, in which.

DETAILED DESCRIPTION OF THE PREFERRED EMBODIMENT

Figure 1:
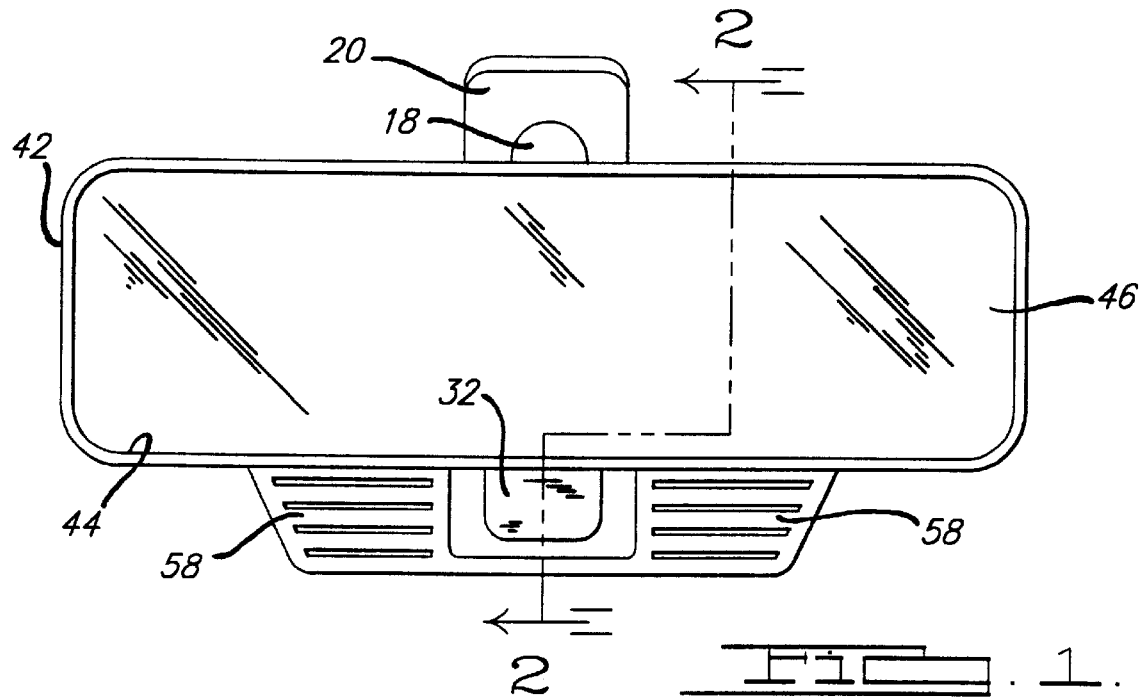
FIG. 1 is a front view of an automatic return rear view mirror according to the present invention.
Figure 2:
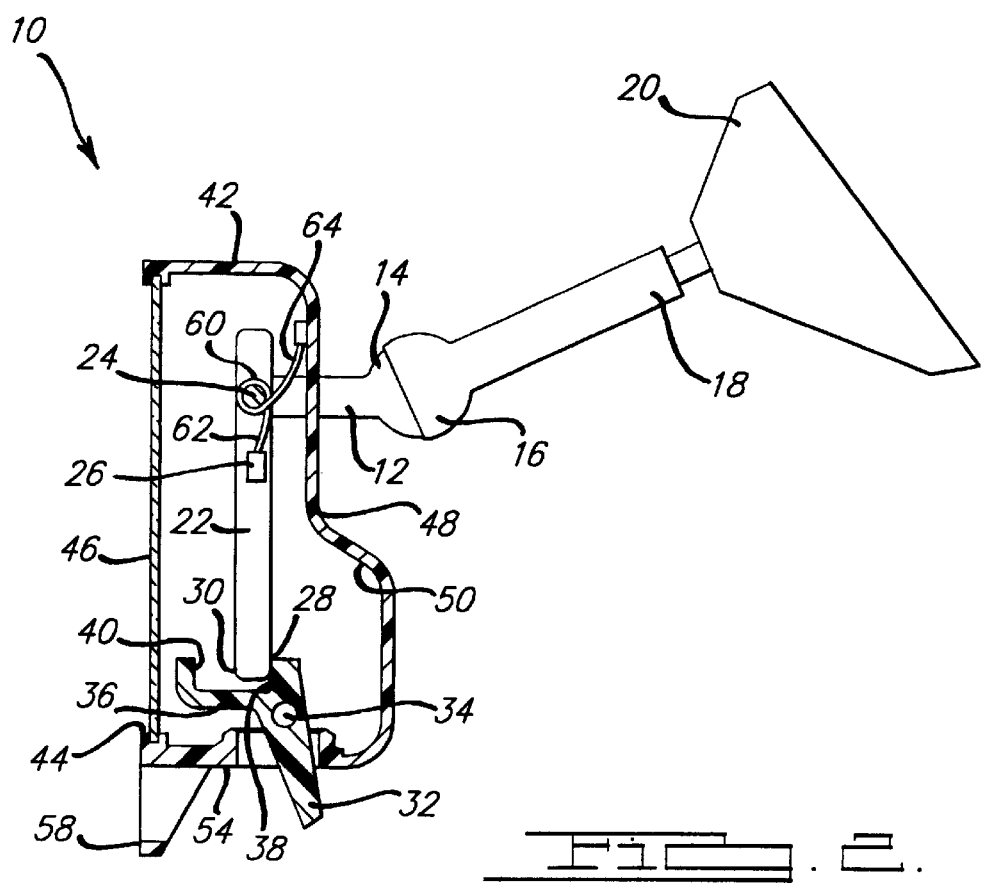
FIG. 2 is a sectional view taken along the line 2—2 of FIG. 1 of an automatic return rear view mirror according to the present invention.
Figure 3:
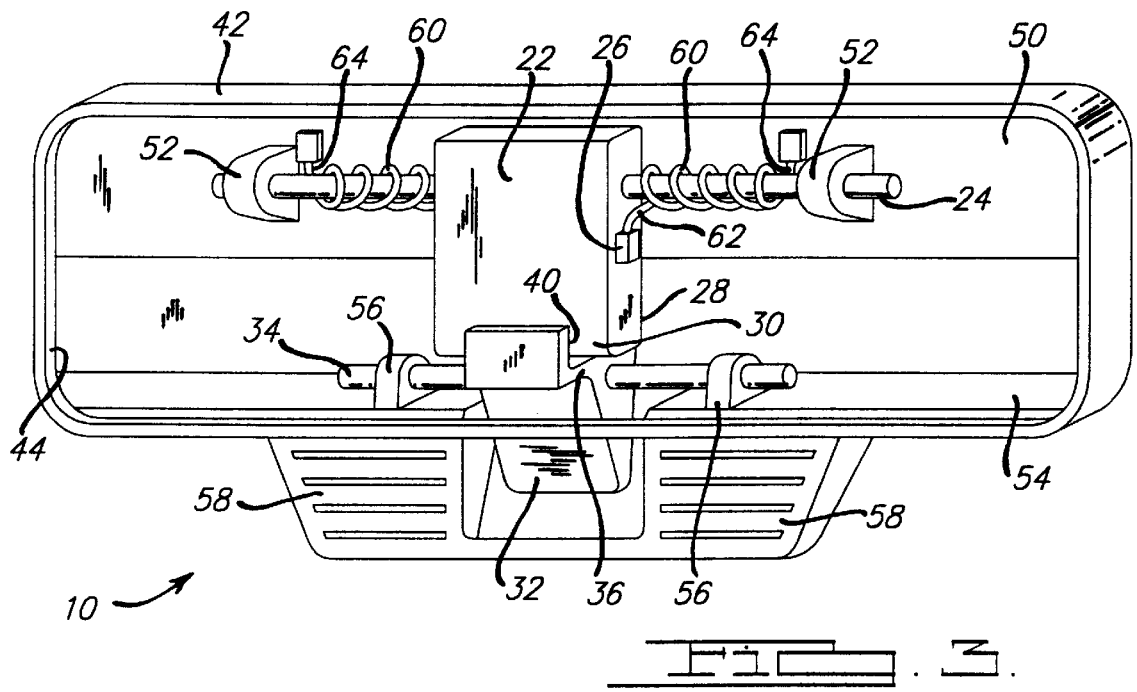
FIG. 3 is a perspective view of an automatic return rear view mirror with the reflective surface removed according to the present invention.

Turning now to the drawings, and in particular to FIG. 1, a front view of an automatic return rear view mirror 10 is shown. As shown in FIGS. 2 and 3, the rear view mirror 10 has rigidly connected thereto a mirror support arm 12. The mirror support arm 12 has a conventional three dimensional adjustment mechanism such as a ball 14 and socket 16 arrangement. Projecting from the adjustment mechanism is an armature 18 which is connected to a conventional vehicle mount 20. The vehicle mount 20 is attached to a portion of the vehicle such as a front window (not shown).

As shown in FIGS. 2 and 3, the rear view mirror 10 has a planar bracket 22 with a bracket rod 24 passing therethrough and rigidly connected thereto. The rod 24 may be insert molded into the bracket 22 or positioned therethrough using a force fit or any other rigid connection method without departing from the scope of the present invention. The bracket 22 has a pair of laterally spaced bracket spring tabs 26 projecting therefrom. The bracket 22 has a lower most portion with a longitudinally forward contacting surface 28 and a rearward contacting surface 30.

As also shown in FIGS. 2 and 3, the mirror 10 has a flip lever 32 with a flip lever rod 34 passing therethrough and rigidly connected thereto. The flip lever 32 has a substantially trough-like, bracket receiving end 36 with a bracket contacting surface 38 and a distally opposed bracket stop surface 40.

As further shown in FIGS. 2 and 3, the mirror 10 has a housing 42 disposed about the bracket 22. The housing 42 has a raised surface 44 adapted to receive a flat reflective surface 46. The housing 42 has a wall 48, opposite the reflective surface 46, having an interior surface 50. As shown in FIG. 3, a pair of bracket rod receiving clevises 52 project from the interior surface 50. The housing 42 also has an inner base 54 having a pair of flip lever rod receiving clevises 56 projecting therefrom. Adjacent the clevises 56 and projecting externally from the base 54 are a pair of laterally spaced control tabs 58.

Shown in FIGS. 2 and 3, the mirror 10 has a pair of torsional springs 60 preferably concentrically mounted around ends of the rod 24. Each torsional spring 60 has a bracket tab contacting end 62 and an wall interior surface contacting end 64.

In assembly as shown in FIG. 3, the bracket 22 is rigidly connected to the mirror support arm 12. A torsional spring 60 is disposed about each end of the bracket rod 24 on preferably lateral sides of the bracket 22. The bracket rod 24 is rotationally received by the clevises 52. The torsional springs 60 are preferably intermediate the clevises 52 and the bracket 22. Each torsional spring 60 bracket tab contacting end 62 is in resilient contact with a respective bracket spring tab 26. Also, each torsional spring 60 wall interior surface contacting end 64 is in resilient contact with the interior surface 50 of the wall 48. The flip lever rod 34 is rotationally received by the clevises 56. The bracket receiving end 36 is situated adjacent the lower end of the bracket 22 in such a way as to have the bracket 22 intermediate the bracket contacting surface 38 and the bracket stop surface 40.

Figure 4:
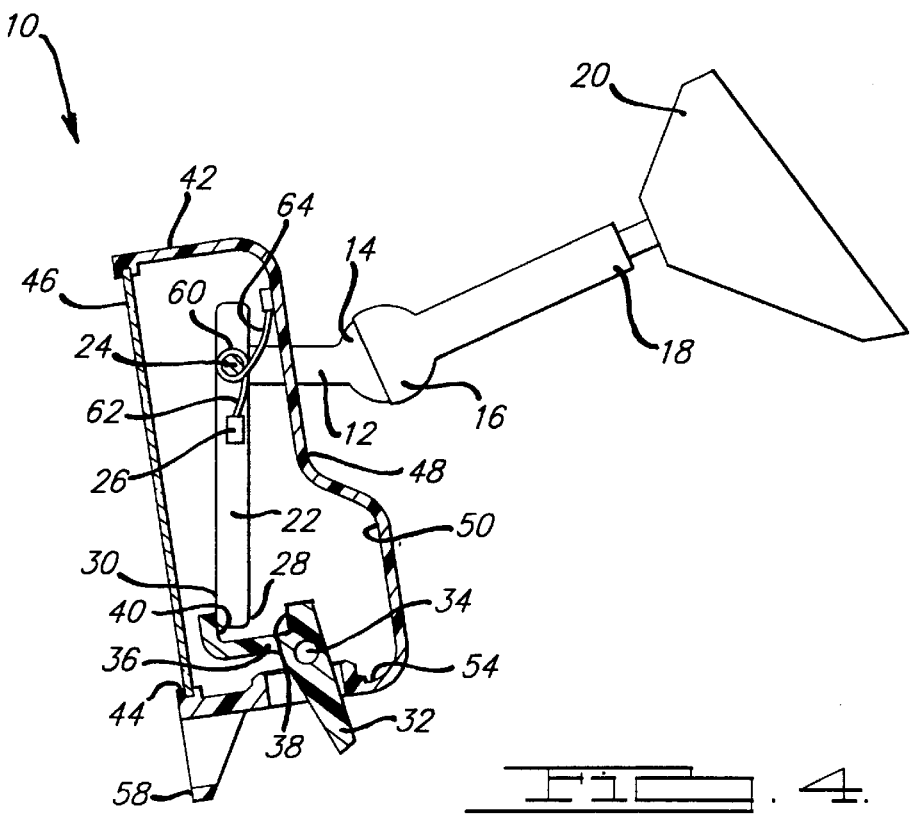
FIG. 4 is a sectional view taken along the line 2—2 of FIG. 1 of an automatic return rear view mirror in a rear seat viewing position according to the present invention.

In use as shown in FIG. 2, the mirror 10 is in a rear window viewing position. This state results from the torsional springs 60 biasing the forward contacting surface 28 of the bracket 22 against the bracket contacting surface 38 of the flip lever 32. As shown in FIG. 4, if the driver wishes to adjust the mirror 10 to a rear seat viewing position, the driver presses the control tabs 58 thereby rotating the housing 42 about the axis of the bracket rod 24. The housing 42 travels until the rearward contacting surface 30 of the bracket 22 touches the bracket stop surface 40 of the flip lever 32. In this position the reflective surface 46 is in a rear seat viewing position. When the driver releases the control tabs 58, the torsional springs 60 function to return the mirror 10 to the rear window viewing position. The flip lever 32 is pivotable from a rear window viewing position to a dimmed rear window viewing position as is known in the art. When the flip lever 32 is pivoted, contact is maintained between the forward contacting surface 28 of the bracket 22 and the bracket contacting surface 38 of the flip lever 32 as a result of the biasing torsional springs 60. The return feature is advantageous because the driver is not required to readjust the mirror 10 after viewing the rear seat area, thereby avoiding distracting the driver's attention from the road.

Only one embodiment of an automotive vehicle automatic return rear view mirror of the present invention has been described. Those skilled in the rear view mirror related arts will appreciate that others may be possible without departing from the scope of the following claims.

We claim:

1. An automotive vehicle rear view mirror assembly comprising:

a bracket having a forward contacting surface and a rearward contacting surface disposed thereon;

a mirror housing pivotally connected to the bracket;

a reflective surface attached to the mirror housing;

a flip lever for selecting between first and second rear window viewing positions, the flip lever having a bracket receiving end with a bracket contacting surface for engaging the forward contacting surface of the bracket only when the mirror housing is in either of the first and second rear window viewing positions, the flip lever further including a bracket stop surface for engaging a rearward contacting surface of the bracket only when the mirror housing is positioned in a rear seat viewing position; and biasing means for urging the mirror housing to automatically return from the rear seat viewing position to either of the two rear window viewing positions.

2. A rear view mirror assembly according to claim 1, wherein the mirror housing includes at least one integral control tab projecting from a perimeter of the mirror housing so as to facilitate manual rotation of the mirror housing from either of the rear window viewing positions into the rear seat viewing position.

3. A rear view mirror assembly according to claim 1, wherein the biasing means includes at least one torsional spring.

4. A rear view mirror assembly according to claim 1, wherein the biasing means includes a pair of torsional springs operatively disposed about a bracket rod rigidly secured to the bracket and pivotally attached to the mirror housing on lateral sides of the bracket.

* * * * *